United States Patent
Wirfs et al.

(10) Patent No.: US 12,149,076 B2
(45) Date of Patent: Nov. 19, 2024

(54) ENERGY SUPPLY DEVICE AND CONSTRUCTION MACHINE

(71) Applicants: Putzmeister Engineering GmbH, Aichtal (DE); REFU Drive GmbH, Pfullingen (DE)

(72) Inventors: Rolf Wirfs, Engstingen (DE); Georg Dielmann, Reutlingen (DE); Johannes Demling, Filderstadt (DE); Sebastian Kerner, Neuffen (DE); Christian Ziemens, Stuttgart (DE); Werner Tausch, Koengen (DE)

(73) Assignees: Putzmeister Engineering GmbH, Aichtal (DE); REFU Drive GmbH, Pfullingen (DE)

( * ) Notice: Subject to any disclaimer, the term of this patent is extended or adjusted under 35 U.S.C. 154(b) by 33 days.

(21) Appl. No.: 18/265,859

(22) PCT Filed: Dec. 6, 2021

(86) PCT No.: PCT/EP2021/084359
§ 371 (c)(1),
(2) Date: Jun. 7, 2023

(87) PCT Pub. No.: WO2022/122638
PCT Pub. Date: Jun. 16, 2022

(65) Prior Publication Data
US 2024/0063638 A1 Feb. 22, 2024

(30) Foreign Application Priority Data
Dec. 8, 2020 (DE) ...................... 10 2020 215 491.0

(51) Int. Cl.
*H02J 3/00* (2006.01)
*H02J 3/46* (2006.01)
(Continued)

(52) U.S. Cl.
CPC ................ *H02J 3/007* (2020.01); *H02J 3/46* (2013.01); *H02M 3/01* (2021.05); *H02M 7/08* (2013.01)

(58) Field of Classification Search
CPC ....................................................... H02J 3/007
(Continued)

(56) References Cited

U.S. PATENT DOCUMENTS

| | | | |
|---|---|---|---|
| 10,583,743 B2 * | 3/2020 | Takada | ..................... B60K 6/46 |
| 2014/0001871 A1 | 1/2014 | Vogman | |
| 2019/0181773 A1 | 6/2019 | Kawai | |

FOREIGN PATENT DOCUMENTS

| | | |
|---|---|---|
| AT | 378 083 B | 6/1985 |
| AT | 409 355 B | 7/2002 |

(Continued)

OTHER PUBLICATIONS

International Search Report (PCT/ISA/210) issued in PCT Application No. PCT/EP2021/084359 dated Mar. 31, 2022 with English translation (4 pages).

(Continued)

*Primary Examiner* — Joseph Chang
(74) *Attorney, Agent, or Firm* — Crowell & Moring LLP

(57) ABSTRACT

An energy supply device for supplying electric loads with electric energy, includes a DC link; a first mains connection to which a first AC voltage grid can be connected as intended; a first rectifier which is designed to rectify an AC voltage corresponding to an AC voltage across the first mains connection or based thereon and to feed the rectified voltage into the DC link; a second mains connection to which a second AC voltage grid can be connected as intended; a second rectifier which is designed to rectify an AC voltage corresponding to an AC voltage across the second mains connection or based thereon; a controllable (Continued)

DC-to-DC converter to a first side of which a voltage rectified by means of the second rectifier is applied, and a second side of which is connected to the DC link; a first current converter which is fed from the DC link and is designed to supply a first electric load with electric energy; a power measuring apparatus which is designed to measure electric power consumed at the first mains connection; and a control apparatus which has a data link to the power measuring apparatus and which is designed to control the DC-DC converter according to the electric power consumed at the first mains connection.

11 Claims, 1 Drawing Sheet

(51) Int. Cl.
*H02M 3/00* (2006.01)
*H02M 7/08* (2006.01)

(58) Field of Classification Search
USPC .............................................. 307/43
See application file for complete search history.

(56) References Cited

FOREIGN PATENT DOCUMENTS

| | | |
|---|---|---|
| DE | 10 2017 202 604 A1 | 8/2018 |
| DE | 10 2017 222 949 A1 | 6/2019 |
| JP | 2006-54941 A | 2/2006 |

OTHER PUBLICATIONS

German-language Written Opinion (PCT/ISA/237) issued in PCT Application No. PCT/EP2021/084359 dated Mar. 31, 2022 (6 pages).
German-language Office Action issued in German Application No. 10 2020 215 491.0 dated Jun. 14, 2021 (seven (7) pages).

\* cited by examiner

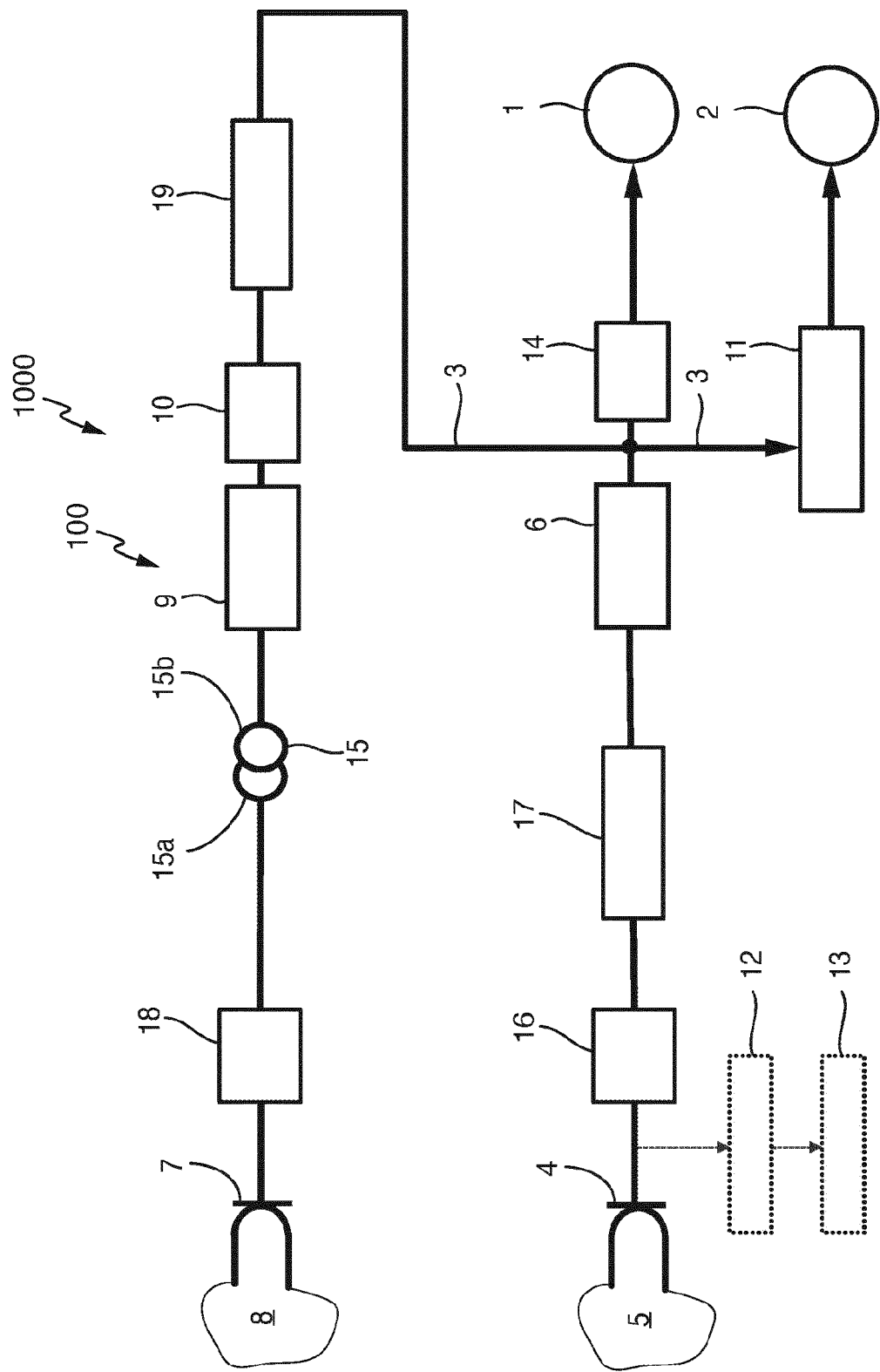

ENERGY SUPPLY DEVICE AND CONSTRUCTION MACHINE

BACKGROUND AND SUMMARY

The invention relates to an energy supply device and a construction machine.

The invention is based on the object of providing an energy supply device and a construction machine that are able to be used as flexibly as possible.

The energy supply device is used to supply electrical loads with electrical energy.

The energy supply device has a conventional intermediate circuit that conducts a buffered intermediate circuit DC voltage, for example.

The energy supply device also has a first network connection to which a first, in particular three-phase, AC voltage network is able to be connected as intended.

The energy supply device also has a first rectifier that is designed to rectify an AC voltage, which corresponds to an AC voltage present at the first network connection, or is based thereon, and to feed the rectified voltage to the intermediate circuit. The first rectifier can be a single-phase or a multi-phase rectifier.

The energy supply device also has a second network connection to which a second, in particular three-phase, AC voltage network is able to be connected as intended.

The energy supply device also has a second rectifier that is designed to rectify an AC voltage, which corresponds to an AC voltage present at the second network connection, or is based thereon. The second rectifier can be a single-phase or a multi-phase rectifier.

The energy supply device also has a controllable unidirectional or bidirectional DC/DC converter, to a first side of which the voltage rectified by means of the second rectifier is applied, and a second side of which is connected to the intermediate circuit. The DC/DC converter is designed to transmit electrical energy/power from the second rectifier in the direction of the intermediate circuit as required.

The energy supply device also has a first converter that is fed from the intermediate circuit and that is designed to supply a first electrical load with electrical energy. By way of example, the converter can be an inverter that generates one or more sinusoidal AC voltages from the intermediate circuit DC voltage so as to be supplied to the first electrical supplier. Alternatively or additionally, the converter can also be in the form of a DC/DC converter that converts a level of the intermediate circuit voltage to a DC voltage having a level that is suitable for the first electrical load.

The energy supply device also has a conventional power measuring apparatus that is designed to measure an electric power drawn at the first network connection.

The energy supply device also has a control apparatus, for example in the form of a microprocessor control apparatus, that has a data connection to the power measuring apparatus and that is designed to actuate the DC/DC converter depending on the electric power drawn at the first network connection so that the DC/DC converter transmits more or less electrical energy/power from the second network connection in the direction of the intermediate circuit in a manner dependent on demand.

In one embodiment, the control apparatus actuates the DC/DC converter in such a way that electric power is transmitted from the second network connection in the direction of the intermediate circuit if the electric power drawn at the first network connection exceeds a threshold value. In this way, it is possible to retrieve electric power from the second connection dynamically as required, with the result that the available total electric power is optimized.

In one embodiment, the control apparatus actuates the DC/DC converter in such a way that a maximum electric power able to be output by the energy supply device corresponds to a sum of the maximum available electric power at the first network connection and the maximum available electric power at the second network connection.

In one embodiment, the energy supply device also has a second converter, for example in the form of a single-phase or a multi-phase inverter or of a DC/DC converter, that is fed from the intermediate circuit and that is designed to supply a second electrical load with electrical energy.

In one embodiment, the energy supply device has a galvanically isolating transformer (isolating transformer), wherein a first winding, or primary winding, of the galvanically isolating transformer is connected to the second network connection, and a second winding, or secondary winding, of the galvanically isolating transformer is connected to the second rectifier.

In one embodiment, the first network connection is a network connection with a current-carrying capacity of 32 A, as is typically used on construction sites, for example.

In one embodiment, the second network connection is a network connection with a current-carrying capacity of 16 A, as is typically used on construction sites, for example.

The construction machine according to the invention has an energy supply device, described above, and an electric drive that forms the first electrical load of the energy supply device and that is therefore supplied with electrical energy by means of the first converter of the energy supply device.

In one embodiment, the construction machine is a thick matter discharge device for discharging thick matter, in particular mortar, wherein the thick matter discharge device has an electrical mixer drive, for mixing the thick matter, which forms the electric drive mentioned above, and which is therefore supplied with electrical energy by means of the first converter of the energy supply device.

In one embodiment, the thick matter discharge device also has an electrical compressor, for generating compressed air, which forms the second electrical load of the energy supply device, and which is therefore supplied with electrical energy by means of the second converter of the energy supply device.

The invention is described in detail below with reference to the drawing.

BRIEF DESCRIPTION OF THE DRAWING

FIG. 1 schematically shows a block diagram of a construction machine having an energy supply device, according to an embodiment of the invention, for supplying electrical loads of the construction machine with electrical energy.

DETAILED DESCRIPTION OF THE DRAWING

FIG. 1 schematically shows a block diagram of a construction machine in the form of a thick matter discharge device 1000 for discharging thick matter, having an energy supply device 100 for supplying electrical loads, in the form of a compressor 1 and a mixer drive 2, of the thick matter discharge device 1000 with electrical energy/power.

The energy supply device 100 has an intermediate circuit 3, at which an intermediate circuit DC voltage of, for example, 550 V DC is present in the case of a network voltage connection of 400 V 3 AC.

The energy supply device 100 also has a first network connection 4 to which a first AC voltage network 5 is able to be connected as intended, for example a construction power network with a current-carrying capacity of 32 A.

The energy supply device 100 also has an optional conventional network filter 16 and an optional downstream smoothing inductor 17 that has a first rectifier 6 connected downstream thereof. The first rectifier 6 is designed to rectify an AC voltage present at the first network connection 4 and to feed the rectified voltage to the intermediate circuit 3.

The energy supply device 100 also has a second network connection 7 to which a second AC voltage network 8 is able to be connected as intended, for example a construction power network with a current-carrying capacity of 16 A.

The energy supply device 100 also has an optional conventional network filter 18 and a galvanically isolating transformer 15, wherein a first winding, or primary winding 15a, of the galvanically isolating transformer 15 is connected to the second network connection 7 via the network filter 18, and a second winding, or secondary winding 15b, of the galvanically isolating transformer 15 is connected to a second rectifier 9. The second rectifier 9 is designed to rectify an AC voltage that is present at the second winding 15b of the galvanically isolating transformer 15 and is based on an AC voltage present at the second network connection 7.

The energy supply device 100 also has a controllable DC/DC converter 10, to a first side of which the voltage rectified by means of the second rectifier 9 is applied, and a second side of which is connected to the intermediate circuit 3 with the interposition of an optional smoothing inductor 19.

The energy supply device 100 also has a first converter in the form of an inverter 11 that is fed from the intermediate circuit 3 and that is designed to supply the mixer drive 2 with electrical energy.

The energy supply device 100 also has a second converter in the form of an inverter 14 that is fed from the intermediate circuit 3 and is designed to supply the compressor 1 with electrical energy.

The energy supply device 100 also has a power measuring apparatus 12 that is designed to measure an electric power drawn at the first network connection 4.

The energy supply device 100 also has a control apparatus 13 that has a data connection to the power measuring apparatus 12 and that is designed to actuate the DC/DC converter 10 depending on the electric power drawn at the first network connection 4. If the electric power drawn at the first network connection 4 exceeds a threshold value, the control apparatus 13 actuates the DC/DC converter 10 in such a way that electric power is transmitted from the second network connection 7 in the direction of the intermediate circuit 3. This makes it possible for a maximum electric power able to be output by the energy supply device 100 to correspond to a sum of the maximum available electric power at the first network connection 4 and the maximum available electric power at the second network connection 7.

Available network connection sockets for supplying construction machines with electric power often cause problems with respect to the available electric connection power. By way of example, a 63 A connection is needed to provide an electric power of 30 kW. Since this connection is not always available and usual construction power distributors are predominantly also only protected at 63 A, only 32 A and 16 A connections usually remain for electric drives of construction machines. The maximum power of the electrical load is currently limited by the maximum connection power of a connection.

FIG. 1 shows an example of a possible circuit with a 32 A connection 4 and a 16 A connection 7.

At the 16 A connection 7, potential isolation takes place with an increase in voltage. The DC/DC converter 10 "shifts" electric power to the intermediate circuit 3 in a current-controlled manner. The potential reference arises via the coupling in the intermediate circuit 3. The central controller 13 checks when additional power is required from the 16 A connection 7 by way of the measuring apparatus 12 at the 32 A connection 4. If all the loads 1, 2 are connected to the 32 A path, the construction machine 1000 can optionally also be operated only at the 32 A connection 4.

According to the invention, a plurality of energy paths or a plurality of connections 4 and 7 are combined in such a way that the usable power increases to the sum of the connection powers. In other words, electrical energy/power is contributed by other connections to the main connection 4 as required, without there being a fixed association between loads 1, 2 and connections 4 and 7. The power of the other connection 7 is supplied to the intermediate circuit 3 and the power yield is maximized overall by measuring the power draw at the main connection 4.

It goes without saying that other second network connections 7 can also be present. The other connection paths then correspond to the path at the second network connection 7, comprising the components: optional network filter 18, galvanically isolating transformer 15, rectifier 9 and DC/DC converter 10, which (also) feeds the intermediate circuit 3.

It goes without saying that more than two converters 11 and 14 fed from the intermediate circuit 3 can also be present for supplying other electrical loads with power.

A maximum power yield of the electrical connection power, for example of a construction machine having two (or more) network connections, is possible by means of the invention. Owing to the galvanically isolating transformer 15, the connections 4 and 7 do not have any influence on one another.

The invention claimed is:

1. An energy supply device for supplying electrical loads with electrical energy, comprising:
    an intermediate circuit;
    a first network connection to which a first AC voltage network is able to be connected as intended;
    a first rectifier that is designed to rectify an AC voltage, which corresponds to an AC voltage present at the first network connection, or is based thereon, and to feed the rectified voltage to the intermediate circuit;
    a second network connection to which a second AC voltage network is able to be connected as intended;
    a second rectifier that is designed to rectify an AC voltage, which corresponds to an AC voltage present at the second network connection, or is based thereon;
    a controllable DC/DC converter, to a first side of which the voltage rectified by the second rectifier is applied, and a second side of which is connected to the intermediate circuit;
    a first converter that is fed from the intermediate circuit and that is designed to supply a first electrical load with electrical energy;
    a power measuring apparatus that is designed to measure an electric power drawn at the first network connection; and
    a control apparatus that has a data connection to the power measuring apparatus and that is designed to actuate the DC/DC converter depending on the electric power drawn at the first network connection.

2. The energy supply device according to claim 1, wherein when the electric power drawn at the first network connection exceeds a threshold value, the control apparatus actuates the DC/DC converter such that electric power is transmitted from the second network connection in a direction of the intermediate circuit.

3. The energy supply device according to claim 1, wherein the control apparatus actuates the DC/DC converter such that a maximum electric power able to be output by the energy supply device corresponds to a sum of the maximum available electric power at the first network connection and the maximum available electric power at the second network connection.

4. The energy supply device according to claim 1, further comprising:
a second converter that is fed from the intermediate circuit and that is designed to supply a second electrical load with electrical energy.

5. The energy supply device according to claim 1, further comprising:
a galvanically isolating transformer, wherein a first winding of the galvanically isolating transformer is connected to the second network connection, and a second winding of the galvanically isolating transformer is connected to the second rectifier.

6. The energy supply device according to claim 1, wherein the first network connection is a 32 A network connection.

7. The energy supply device according to claim 6, wherein the second network connection is a 16 A network connection.

8. The energy supply device according to claim 1, wherein the second network connection is a 16 A network connection.

9. A construction machine, comprising:
an energy supply device according to claim 1; and
an electric drive that is supplied with electrical energy by way of the first converter of the energy supply device.

10. The construction machine according to claim 9, wherein the construction machine is a thick matter discharge device for discharging thick matter, and
the thick matter discharge device comprises the electrical drive in the form of an electrical mixer drive for mixing the thick matter, which is supplied with electrical energy by way of the first converter of the energy supply device.

11. The construction machine according to claim 10, wherein the thick matter discharge device further comprises:
an electrical compressor for generating compressed air, which is supplied with electrical energy by way of a second converter of the energy supply device.

* * * * *